United States Patent
Horiuchi et al.

(10) Patent No.: US 6,841,273 B2
(45) Date of Patent: Jan. 11, 2005

(54) SILICON/SILICON CARBIDE COMPOSITE AND PROCESS FOR MANUFACTURING THE SAME

(75) Inventors: Yushi Horiuchi, Yamagata (JP); Masahiro Yamaguchi, Yamagata (JP); Jianhui Li, Yamagata (JP)

(73) Assignee: Toshiba Ceramics Co., Ltd., Tokyo (JP)

( * ) Notice: Subject to any disclaimer, the term of this patent is extended or adjusted under 35 U.S.C. 154(b) by 175 days.

(21) Appl. No.: 10/023,799

(22) Filed: Dec. 21, 2001

(65) Prior Publication Data

US 2002/0151428 A1 Oct. 17, 2002

(30) Foreign Application Priority Data

Dec. 27, 2000 (JP) .......................................... 2000-398035
Mar. 23, 2001 (JP) .......................................... 2001-084902

(51) Int. Cl.[7] ................................................. B32B 9/00
(52) U.S. Cl. ......................... 428/698; 428/408; 428/446; 428/620
(58) Field of Search ................................ 428/697, 446, 428/698, 408, 620; 264/682, 29.1; 156/89.26, 89.25, 89.28

(56) References Cited

U.S. PATENT DOCUMENTS

| 6,051,096 | A | | 4/2000 | Nagle et al. | |
|---|---|---|---|---|---|
| 6,258,737 | B1 | * | 7/2001 | Steibel et al. | 442/172 |
| 6,576,076 | B1 | * | 6/2003 | Tani | 156/89.26 |

FOREIGN PATENT DOCUMENTS

| DE | 2 131 792 | 12/1972 |
|---|---|---|
| GB | 1 360 920 | 7/1974 |
| JP | 49-39887 | 10/1974 |
| JP | 63-242969 | 10/1988 |
| JP | 2-56307 | 11/1990 |

OTHER PUBLICATIONS

Patent Abstracts of Japan, vol. 1999, No. 11, Sep. 30, 1999, JP 11–147779, Jun. 2, 1999.
D. Shin et al., "Silicon/Silicon Carbide Composites Fabricated by Infiltration of a Silicon Melt into Charcoal", Journal of the American Ceramic Society, American Ceramic Society, vol. 82, No. 11, Nov. 1999, pp. 3251–3253.

* cited by examiner

Primary Examiner—Deborah Jones
Assistant Examiner—Abraham Bahta
(74) Attorney, Agent, or Firm—Foley & Lardner

(57) ABSTRACT

The present invention provides a silicon/silicon carbide composite and having a high quality in avoiding warp or breakage and in a corrosion resistance, a durability, a heat shock resistance and particularly suitable used for semiconductor heat treatment member such as a dummy wafer or the like and a process for manufacturing a high purity silicon/silicon carbide composite containing a limited amount of carbon left without reaction. The present invention uses a silicon/silicon carbide composite comprised of 45 to 75 weight % of silicon and 25 to 55 weight % silicon carbide, said silicon carbide being formed from an assembly of fibers each having a thickness of 150 $\mu$m or less and a length of 0.8 to 3.5 mm. The present invention is directed to a process for manufacturing a silicon/silicon carbide composite which comprises a first step where cellulose fibers with a fiber thickness of 150 $\mu$m or less is heated at a temperature of 500° C. to 1500° C. in a non-oxidizing atmosphere to produce a porous carbon body with a bulk density of 0.10 to 0.80 g/cm$^3$ and a second step where said porous carbon body is silicification in an atmosphere containing silicon.

30 Claims, No Drawings

SILICON/SILICON CARBIDE COMPOSITE AND PROCESS FOR MANUFACTURING THE SAME

BACKGROUND OF THE INVENTION

1. Field of the Invention

The present invention relates to a silicon/silicon carbide composite and a process for manufacturing the same and more particularly to a silicon/silicon carbide composite which is suitably used for a semiconductor heat treatment member such as a dummy wafer or the like and a process for manufacturing the silicon/silicon carbide composite using cellulose fibers as material.

2. Description of the Related Art

Because the silicon carbide material has characteristics of having high quality in hardness, heat resistance and electric resistance, it is used for an abrasive, a fire resistant material and a heating element or the like.

However, because of such characteristic of high quality in hardness as described above, the silicon carbide material has a defect that its moldability is poor to such an extent that molded products are found fragile.

Conventionally, a reaction sintering method involving use of silicon carbide powder as its starting material and a carbon silicification method using a carbon molding as its base material are subjected to a silicification step or the like for the manufacture of said silicon carbide material.

The reaction sintering method is a method for manufacturing the silicon carbide material by using the silicon carbide powder as its material. After a binder or the like is added to said silicon carbide powder to obtain a molding, said molding is then calcinated at a temperature of 700° C. through 900° C. in a non-oxidizing atmosphere. Then, a fused silicon is permeated thereinto before a reaction sintering is conducted.

On the other hand, a process known as the carbon silicification method is generally disclosed in Japanese Patent Examined Publication 02-56307 or Japanese Patent Unexamined Publication 63-242969; fused silicon or silicon monoxide gas is permeated into a porous molding made of carbon material such as graphite or pitch or the like, where the carbon is silicified with a reaction of

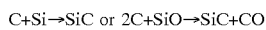

or the like.

However, it was found in said reaction sintering method that the silicon carbide powder is too expensive and the purity of the silicon carbide material as a product is too dependent on the purity of said raw material. Therefore, such expensive high purity silicon carbide powder makes the reaction sintering method unfeasible in view of the cost of manufacturing the silicon carbide material of high purity.

Also, it has a problem that if molding is conducted after calcinations, the hardness increases due to carbonization of the binder to affect the pre-sintering workability and increase the cost.

Further, micro-grit with a particle diameter of several $\mu$m and coarse grit with a particle diameter of tens to hundreds $\mu$m are normally mixed for making higher density using the silicon carbide powder for the raw material. However, said coarse grit is easily lost at the time of molding, thus worsening the workability thereof.

On the other hand, it is difficult to silicify such dense carbon material completely by said carbon silicification method because the speed of said reaction is too low. Most of the time, only the surface of the carbon material is silicified resulting in a silicon carbide layer being formed thereon. Therefore, it has been made into a product only in the form of composite material of carbon/silicon carbide.

Also, a method of adding resin to the carbon material for molding is already known in said carbon silicification process from the viewpoint of size stability and molding easiness. For example, Japanese Patent Examined Publication 49-39887 already discloses a method for preparing a silicon carbide material by carbonizing a molding made of a cellulose sheet such as a sheet of paper treated with the resin.

However, with this method, it is difficult to silicify completely the obtained carbon body as deep as the inside thereof because of the high density and elaborate structure thereof with the result that only the silicon carbide in the form of a thin multiplayer structure is obtained.

In this connection, the dummy wafer, wafer boat, reactor core tube or other semiconductor heat treatment members used in the reactor for various semiconductor wafer heat treatments is in general manufactured from a material composed of silicon, a material composed of CVD silicon carbide alone, or a material prepared by forming a CVD silicon carbide film on the surface of a silicon/silicon carbide composite (having silicon contents of 15 to 20 weight %) obtained by adding a binder to two or three types of silicon carbide powder having different mean particle sizes then kneading, corning, forming, calcinating and sintering the same through reaction with fused silicon.

In said semiconductor heat treatments, the CVD film formation on the wafer to be treated simultaneously causes the formation of a CVD film also on the surface of the semiconductor heat treatment member such as a dummy wafer or the like. If such treatments are repeated, the CVD film formed on the surface of said member will become thicker to such an extent the CVD film becomes so brittle due to the difference of the thermal expansion coefficients between said member and the CVD film thereon that an exfoliation thereof can take place during the heat treatments. Such exfoliated CVD film can be broken into particles, which will scatter and fly within the reactor to cause the contamination thereof, lowering the yield. If worse, the member itself can warp or be broken.

Given the situation, the semiconductor heat treatment member itself must be subjected to acid washing after a predetermined service time such that the CVD film on the surface thereof is able to be removed for reuse.

However, semiconductor heat treatment members made of the conventional silicon material is so fragile, limited in the mechanical strength and subject to breakage that an extra care is needed in handling thereof. Moreover, it is so difficult to remove the silicon film alone by means of acid washing in the case of the heat treatment for forming the silicon film thereon that the member itself will be corroded if actually subjected thereto to shorten the service life thereof.

In order to reduce said corrosion of the member caused by the acid, it was proposed to form a silicon carbide film on the surface of the member. However, it was found extremely difficult to form a uniform silicon carbide film without micro cracks being formed on the silicon material surface due to the difference of thermal expansion coefficient between the silicon member and the silicon carbide film.

On the other hand, the silicon/silicon carbide composite obtained from said silicon carbide powder can enjoy a longer service life because the CVD silicon carbide film formed on the surface thereof helps reduce the corrosion of the member caused by the acid washing.

However, the silicon carbide of 80 to 85 weight % contained in the silicon/silicon carbide composite can produce particles after the exfoliation of the silicon film as a result of the difference between the thermal expansion coefficients of the member and the silicon film.

On the other hand, the member made of the CVD silicon carbide material alone has the similar tendency as the silicon/silicon carbide composite produced from said silicon carbide power. Moreover, said member is in general prepared by forming a CVD silicon carbide film on the surface of a carbon substrate and, thereafter, burning out said carbon substrate with the result that the difference between thermal expansion coefficients of the carbon substrate and the CVD silicon carbide film can cause warps thereof and a resultant breakage thereof to make the manufacture of a large product therefrom difficult.

SUMMARY OF THE INVENTION

The present invention is made to solve problems in the prior art as mentioned above and it is an object of the invention to provide a silicon/silicon carbide composite which has characteristics of having high quality in hardness with a limited possibility of warps or breakage, in corrosion resistance, in durability, and in heat shock resistance and particularly which is preferably used for semiconductor heat treatment such as dummy wafers.

Further, it is the second object to provide a process for manufacturing a silicon/silicon carbide composite which is able to provide a high purity silicon/silicon carbide composite with a limited amount of carbon left without reacting with silicon by using a carbon silicification method with cellulose fibers such as paper pulp being used as its material.

The silicon/silicon carbide composite according to the present invention is characterized in being composed of 45 to 75 weight % of silicon and 25 to 55 weight % of silicon carbide, said silicon carbide being formed from an assembly of fiber elements, each having a thickness of 150 µm or less and a length of 0.8 to 3.5 mm.

Said silicon/silicon carbide composite assures sufficient mechanical strength, a heat impact resistance and in case a silicon carbide film is to be formed on the surface thereof by the CVD process, a likelihood of silicon carbide film exfoliation due to difference of thermal expansion coefficients is all eliminated. This feature is preferable as used for a semiconductor heat treatment member.

Said silicon/silicon carbide composite is preferably formed with a silicon carbide film having a thickness of 30 to 500 µm on the surface thereof.

Such formation of the silicon carbide film on the surface of the silicon/silicon carbide composite assures improvements in corrosion resistance shown and the durability at the time of acid washing, and heat impact resistance. The thickness within the above mentioned range is particularly preferable in view of the prevention of exfoliation of the silicon carbide film.

It is further preferred that said silicon/silicon carbide composite is formed with a silicon carbide film having a thickness of 30 to 150 µm on the surface thereof to constitute a dummy wafer having a total thickness of 0.5 to 1 mm.

Such silicon/silicon carbide composite assures a sufficient corrosion resistance against acid washing as well as eliminating the likelihood of exfoliation of the silicon film on the surface of a dummy wafer used in the heat treatment for forming a silicon film on the wafer to be treated, thus providing a dummy wafer which endure through repeated uses.

Further, a process for manufacturing a silicon/silicon carbide composite in accordance with present invention comprises a first step where cellulose fiber each having a fiber thickness of 150 µm or less are heated at the temperature of 500° C. to 1500° C. in an non-oxidizing atmosphere to produce a porous carbon body having a bulk density of 0.10 to 0.80 g/cm$^3$; and a second step where said porous carbon body is silicified in an atmosphere containing silicon.

By using said cellulose fibers as the material and silicifying the same in said porous carbon body, a high purity silicon/silicon carbide composite with a limited amount of carbon being left without reaction is able to be easily obtained.

It is preferred that the fiber thickness of said cellulose fiber is 5 to 80 µm.

Within above identified range of fiber thickness, it is able to exist as a realistic structure for the fiber and it is preferred from the viewpoint of production cost and reducing the carbon left without reaction.

It is preferred that the length of each cellulose fiber 1.5 mm or more.

Use of such cellulose fibers each having the above mentioned length assures the improvement in the strength of the porous carbon material to such an extent that handling thereof is easier and the provision of a silicon/silicon carbide composite having a greater strength.

Furthermore, it is preferred that said cellulose fibers are paper pulp.

The reason for using paper pulp is that a uniform bulk density of the porous carbon body produced by carbonization can be obtained and also it is easier to handle.

Also, it is preferred that the bulk density of the porous carbon body obtained from said first step is 70 g/cm$^3$ or less.

If the bulk density of the porous carbon body is within above identified range, the carbon left without reaction is reduced.

It is preferred that the silicification treatment in said second step is by way of reaction with fused silicon or silicon monoxide gas.

These processes for silicification treatment are suitable process for producing the silicon/silicon carbide composite with a limited amount of carbon left without reaction.

In said manufacturing process, it is preferred that the porous carbon body produced by said first step is heated at a temperature of 1100° C. to 2000° C. in an atmosphere of halogen gas to be purified prior to the second step.

Said process is for conducting a purification treatment in the manufacture of silicon/silicon carbide composite of higher purity.

DESCRIPTION OF THE PREFERRED EMBODIMENTS

The present invention is described in detail hereinafter.

The silicon/silicon carbide composite according to the present invention is composed of 45 to 75 weight % of silicon and 25 to 55 weight % of silicon carbide, said silicon carbide being formed from an assembly of fibers, each having a thickness of 150 µm or less and a length of 0.8 to 3.5 mm.

Said silicon/silicon carbide composite is extremely strong, and prevents warp or breakage while showing an excellent characteristics in corrosion resistance and durability and particularly assures the provision of silicon/silicon carbide composite which can be preferably used for the semiconductor treatment of dummy wafers or the like.

As mentioned above, the silicon/silicon carbide composite according to the present invention is composed of 45 to 75 weight % of silicon and 25 to 55 weight % silicon carbide.

In case the silicon content is less than 45 weight %, the remaining silicon carbide contents becomes larger. Therefore, if such composite is used for forming a silicon film on the surface of the wafer to be treated in the heat treatment, the difference of thermal expansion coefficients between the composite and the silicon film becomes so great that the silicon film on the composite is easily exfoliated to prompt the production of particles.

If on the other hand, the silicon content exceeds 75 weight %, the remaining silicon carbide content becomes too less, making it impossible to obtain sufficient mechanical strength, heat shock resistance or the like. If CVD silicon carbide film is required to be formed on the surface thereof, the difference of thermal expansion coefficients thereof from said silicon carbide film is so great that said silicon carbide film on the surface thereof easily exfoliate with the result that the sufficient strength otherwise to be obtained in forming a silicon carbide film thereon cannot be obtained and particles are produced more easily.

In this connection, the contents of silicon and silicon carbide in said silicon/silicon carbide composite are required to be within the range mentioned above. If, however, said composite is to be used as a semiconductor heat treatment member, other inevitable impurities other than silicon and silicon carbide may be contained in the range of a few weight % so long as those impurities will not affect semiconductors such as the wafer to be treated.

The silicon carbide contained in said composite is formed of an assembly of fibers each having a thickness of 150 $\mu$m or less.

If the thickness of each fiber exceeds 150 $\mu$m, it is difficult to obtain a sufficient strength required for an industrial use, particularly for the semiconductor heat treatment.

The required thickness is preferably 5 to 150 $\mu$m. Said silicon carbide is preferable from the viewpoint of industrial production of composite with silicon having a content range of 45 to 75 weight % and if the thickness thereof is less than 5 $\mu$m, it is difficult to obtain a sufficient shock resistance.

Further, said silicon carbide contained in said composite is formed from an assembly of fibers each having a length of 0.8 to 3.5 mm.

If the length is less than 0.8 mm, it is difficult to obtain a sufficient mechanical strength as a semiconductor heat treatment composite and it is preferable to have a length of 1.5 mm from the viewpoint of obtaining a member of higher strength.

On the other hand, if the length exceeds 3.5 mm, the industrial production thereof itself is difficult.

As mentioned above, the silicon/silicon carbide composite according to the present invention contains the silicon carbide in the form of an assembly of fibers, which are procured from cellulose fibers such as pulps for paper making.

It is preferred that said silicon/silicon carbide composite have a silicon carbide film on the surface thereof, said film having a thickness of 30 to 500 $\mu$m.

Use of such composite is preferable in the interest of improving the corrosion resistance in acid washing and durability and it is particularly preferred that the film has a thickness of 30 $\mu$m or more from the viewpoint of obtaining a sufficient corrosion resistance.

However, while said composite contains silicon carbide in the form of an assembly of fibers of 25 to 55 weight % to facilitate a silicon film firmly on the surface of said composite, the silicon carbide film tends to easily exfoliate if the thickness thereof exceeds 500 $\mu$m.

Further, it is preferred that the silicon/silicon carbide composite according to the present invention has a silicon carbide film on the surface thereof having a thickness of 30 to 150 $\mu$m and it is also preferred that the composite includes a dummy wafer having a total thickness of 0.5 to 1 mm.

The dummy wafer preferably has a thickness identical to that of the wafer to be treated and normally having a thickness of 0.5 to 1 mm totally.

The thickness of the silicon carbide film on the surface of the dummy wafer is preferably 30 $\mu$m or more from the viewpoint of having a sufficient corrosion resistance when washed in acid as mentioned above.

If the thickness of the silicon carbide film exceeds 150 $\mu$m, the difference of thermal expansion coefficients between the dummy wafer and the silicon film formed thereon becomes larger with the result that the silicon film formed on the composite tends to exfoliate to prompt the production of particles at the heat treatment for forming a silicon film on the surface of a wafer to be treated.

Further, said silicon/silicon carbide composite is preferably produced in the following process such that high purity products are obtained.

Further, since the silicon/silicon carbide composite is in general extremely hard and difficult to work, it is preferred that said composite has been worked in advance in to the form of a desired semiconductor heat treatment member such as a dummy wafer. Further, although the process for forming said silicon carbide film on the surface of the substrate of the silicon/silicon carbide composite is not limited to a particular process, such process is usually conducted by the CVD method; for example, the process includes forming a thin film by subjecting halogenated organic silicon compound to reduction heat decomposition by use of a gas mixture of halogenated organic silicon compound and hydrogen and depositing the resultant silicon carbide on the substrate of the dummy wafer.

The process for manufacturing a silicon/silicon carbide composite in accordance with the present invention, first of all, has a step in which cellulose fibers each having a fiber thickness of 150 $\mu$m or less are heated at a temperature of 500° C. or more in a non-oxidizing atmosphere such that a porous carbon body with the bulk density of 0.10 to 0.80 g/cm$^3$ is produced.

Then, as a second step, said porous carbon body is silicified in an atmosphere containing silicon therein.

The present invention provides a high purity silicon/silicon carbide composite with a limited amount of carbon left therein without reacting with silicon by subjecting material such as cellulose fibers to a carbonization treatment to prepare a porous carbon body having a bulk density of 0.10 to 0.80 g/cm$^3$ and silicifying the thus prepared porous carbon body.

It is preferred in the present invention that the cellulose fibers used as the material are fibers such as seeds of a plant, bast fibers or wood tissues to assure a uniform bulk density of the porous carbon body after carbonization.

Also, it is preferred that paper pulp is used because it is easy to handle.

Said cellulose fiber thickness normally represents a diameter of a fiber. However, when hollow tube type fibers are used, the fiber thickness is represented in a wall thickness of the tube portion. Because the inside of the tube portion is not needed to be silicified, it is preferred to regard the wall thickness of the tube portion as the fiber thickness rather than a diameter of the tube portion.

The fiber thickness in the present invention is 150 μm or less. If the fiber thickness exceeds 150 μm, carbon with the amount of 1 weight % or more still remains within the silicon/silicon carbide composite because of not reacting completely with fused silicon.

Further, the fiber thickness is considered the thinner the better but it is preferred that the fiber thickness is within a range of 5 to 80 μm. It is difficult to exist in the form of a structure as a fiber when the fiber thickness is less than 5 μm. On the other hand, if the fiber thickness exceeds 80 μm, it is not preferable from the viewpoint of the production cost. By reducing the fiber thickness down to 80 μm or less, it is ensured that the carbon left without reaction within the silicon/silicon carbide composite is minimized.

Moreover, it is preferred that the length of said cellulose fibers is 1.5 mm or more. By using the cellulose fiber with a length of 1.5 mm or more, the strength of the porous carbon body increases to a point where it is easy to handle and also the silicon/silicon carbide composite with higher strength can be obtained.

Carbonization of said cellulose fibers is done by heating the same at a temperature of 500° C. to 1500° C. or more in a non-oxidizing atmosphere. To prevent the carbon inside the cellulose fiber from oxidizing, it is required to have a non-oxidizing atmosphere and generally it is an inert gas atmosphere such as a nitrogen gas or an argon gas, a vacuum or reduced pressure of 10 torr or less.

Further, the temperature at the time of conducting the carbonization is 500° C. through 1500° C. If the temperature is less than 500° C., the carbonization will not proceed sufficiently and there is a likelihood that the silicification will not take place sufficiently at the second step. On the other hand, if the carbonization temperature is more than 1500° C., there is a likelihood that the graphitization occurs with the result that the porous carbon body with the bulk density of 0.10 to 0.80 g/cm³ will not be obtained.

The porous carbon body obtained by the first step is with a bulk density of 0.10 to 0.80 g/cm³. When the bulk density is less than 0.10 g/cm³, it is difficult to maintain the strength required for a structure. On the other hand, if the bulk density exceeds 0.80 g/cm³, the amount of remaining carbon increases. It is more preferred that said bulk density is 0.70 g/cm³ or less.

Next, the second step in which said porous carbon body is silicified is conducted in an atmosphere containing silicon. This silicification treatment may be conducted in a way similar to the silicification treatment which uses the normal carbon material such as pitch or carbon black or the like as material. Particularly, it is preferred in the present invention that the reaction takes place with either fused silicon or silicon monoxide gas. These silicification treatment may introduce silicon into the inside of the porous carbon body and it is a preferable process to produce the silicon/silicon carbide composite with a limited amount of carbon left therein without reacting with silicon.

For reaction with fused silicon in a concrete way, the porous carbon body is dipped into fused silicon in a reduced pressure atmosphere and at a temperature of more than 1400° C. and more preferably at a temperature of approximately 1500° C.

Moreover, the step to start the reaction with the silicon monoxide gas in a concrete way, causes the carbon in the porous carbon to react with silicon monoxide in the non-oxidizing atmosphere and at a temperature of approximately 1900° C. to obtain the silicon/silicon carbide composite.

In order to obtain a silicon/silicon carbide composite of higher purity in said producing processes, it is preferred that the porous carbon body obtained by said first step is heated at a temperature of 1100° C. through 2000° C. in the halogen gas atmosphere to be purified before moving on to the second step. This purifying treatment may be conducted in a way similar to the purifying treatment which uses the normal carbon material such as pitch or carbon black or the like as the material. In a concrete manner, by heating at a temperature of 1100° C. through 2000° C. in a chlorine gas or hydrogen chloride gas atmosphere, the impurities such as an alkali metal or the like contained in the porous carbon body obtained by the first step are removed.

The porous carbon body subjected to the purifying treatment is silicified by a process similar to the above to obtain the silicon/silicon carbide composite with higher purity.

EXAMPLES

Although the present invention is described concretely on the basis of examples hereinafter, it is not limited by these examples.

Examples 1 to 6

A molding containing the cellulose fibers of fiber thicknesses as shown in Examples 1 to 6 of Table 1 and the length of 3 mm was carbonized at a temperature of 1000° C. to obtain the porous carbon body.

The bulk density of this porous carbon body was measured by the Archimedean Method.

Next, fused silicon was permeated into said porous carbon body at a temperature of 1500° C. such that the silicon/silicon carbide composite was produced.

The bulk density and the porosity of said silicon/silicon carbide composite were measured by the method in accordance with JIS R 7222-1979.

Also, the amount of carbon left therein without reacting with silicon was measured by the Combustion Heating Method.

The results are shown in Table 1.

Comparative Examples 1 to 3

Cellulose fibers each having the fiber thicknesses as shown in Comparative Examples 1 to 3 of Table 1 and the lengths of 3 mm were selected as the material to produce the silicon/silicon carbide composite in a manner similar to the Example 1 and various measurements were conducted.

The results are shown in Table 1.

Here, the silicon carbide produced in the Comparative Example 3 collapsed.

Comparative Example 4

Pitch having the bulk thickness of 20 μm was selected as material to produce the silicon/silicon carbide composite in a manner similar to Example 1 to conduct the measurement of the bulk density.

The results are shown in Table 1.

Comparative Example 5

Carbon black having a bulk thickness of 20 μm was selected for a material to produce the silicon carbide material in a manner similar to the Example 1 to measure the bulk density thereof.

The result is shown in Table 1.

When the fused silicon is permeated into said porous carbon body at a temperature of 1500° C., the silicified portions and the not-silicified portions were separated in the form of lamellae to such an extent that the shape could not be maintained.

Comparative Example 6

Isotropy carbon material having a bulk thickness of 70 μm was selected for material to produce the silicon carbide material in a manner similar to the Example 1 to measure the bulk density.

The result is shown in Table 1.

When the fused silicon is permeated into said porous carbon body at a temperature of 1600° C., only the surface of the porous carbon body was silicified but not the inside thereof.

TABLE 1

| Fiber (bulk) thickness (μm) | Bulk density of the porous carbon body (g/cm$^3$) | Silicon carbide material Density (g/cm$^3$) | Porosity (%) | Carbon left without reaction (wt %) |
|---|---|---|---|---|
| Example | | | | |
| 1    20 | 0.394 | 2.639 | 0.23 | 0.23 |
| 2    20 | 0.688 | 2.927 | 0.10 | 0.16 |
| 3    38 | 0.633 | 2.852 | 0.30 | 0.13 |
| 4    46 | 0.241 | 2.533 | 0.10 | 0.09 |
| 5    80 | 0.605 | 2.828 | 0.25 | 0.20 |
| 6   150 | 0.423 | 2.720 | 0.40 | 0.25 |
| Comparative example | | | | |
| 1    70 | 0.810 | 2.941 | 0.04 | 1.11 |
| 2   180 | 0.666 | 2.913 | 0.22 | 2.36 |
| 3     3 | 0.095 | 2.480 | 0.89 | 0.05 |
| 4   200 | 0.528 | 2.799 | 0.60 | 3.60 |
| 5    20 | 0.795 | — | — | — |
| 6    70 | 1.60 | — | — | — |

As shown in Table 1, the cellulose fibers each having the fiber thickness of 150 μm or less were selected whereas the bulk density of the produced porous carbon body was within a range of 0.10 g/cm$^3$ to 0.80 g/cm$^3$ (Examples 1 to 6) to obtain a more preferable and dense silicon/silicon carbide composite with the amount of carbon left without reaction being 0.25 weight % or less and the porosity thereof being 0.4% or less.

On the other hand, when the bulk density of the porous carbon body exceeds 0.80 g/cm$^3$ (Comparative Example 1) or cellulose fibers each having fiber thickness of more than 150 μm were selected as the materials (Comparative Example 2), the amount of carbon left without reacting with silicon within the produced silicon/silicon carbide composite was 1 weight % or more.

Further, when the bulk density of the porous carbon body was less than 0.10 g/cm$^3$ (Comparative Example 3), the amount of carbon left without reacting with silicon was in the lowest amount of 1 weight % whereas the strength of the porous carbon body composite was too small to maintain the form while being silicified.

Moreover, when the porous carbon body made from pitch as material (Comparative Example 4) was selected, the particles of the pitch tend to turn into lumps until the bulk thickness reaches 150 μm or more. Therefore, the carbon left without reacting with silicon tends to remain inside the produced silicon/silicon carbide composite to such an extent the amount was as much as 3.60 weight % showing the largest value.

Further, when the porous carbon body made from the carbon black was selected as material (Comparative Example 5), the bulk thickness was found to be as thick as 20 μm. However, because of the microscopic structure of the carbon black being observed in the form of layers, when the fused silicon is permeated, the silicification proceeds in the direction of the layer to such an extent that the lamellae separation takes place with the result that the shape could not be maintained because of the swelling between the layers.

Furthermore, when the special carbon material (isotropic carbon material) was selected as the material (Comparative Example 6), the structure of the porous carbon body becomes dense where its bulk density exceeds 0.80 g/cm$^3$. Therefore, when the fused-silicon is permeated as described above, only the surface of the porous carbon body was silicified but not the inside.

For the reasons described above, it was confirmed that the preferable and dense silicon/silicon carbide composite with the amount of carbon left without reacting being 0.25 weight % or less and porosity being 0.4% or less was produced when the cellulose fibers were used as material, the fiber thickness of the cellulose fiber is 150 μm or less and also the bulk density of the produced porous carbon body is within a range of 0.10 to 0.80 cm$^3$.

Here, each of the moldings with the cellulose fiber as its material in accordance with above identified Examples 1 to 6 and Comparative Examples 1 to 3 has different types of fiber and/or density of the moldings.

Examples 7 to 9

A molding with the cellulose fibers each having a fiber thickness of 50 μm and the length as shown in Examples 7 to 9 of Table 2 was carbonized at 1000° C. such that the porous carbon body was produced to measure the bending strength.

Next, fused silicon was permeated into the produced porous carbon body at a temperature of 1500° C. such that the silicon/silicon carbide composite was produced to measure the bending strength.

These results are shown in Table 2.

TABLE 2

| Examples | Length of the cellulose fiber (mm) | Hardness of the porous carbon body (MPa) | Hardness of the silicon carbide composite (MPa) |
|---|---|---|---|
| 7 | 0.88 | 1 | 220 |
| 8 | 1.50 | 2.5 | 285 |
| 9 | 3.88 | 3.6 | 320 |

As shown in Table 2, by setting the length of the cellulose fiber 1.5 mm or more, the hardness of the porous carbon body becomes 2 MPa or more to make the same easier to handle. Also, it has approved that the strength of the silicon/silicon carbide composite becomes higher.

Example 10

A molding is produced from the cellulose fibers each having a fiber thickness of 50 μm and a length of 3 mm using paper pulp as material.

A sample having a volume of 5 cm³ was collected from a given portion of the molding to be subjected to the measurement of the density to obtain the standard deviation of the resulted density.

Said molding was carbonized at a temperature of 1000° C. to obtain a porous carbon body.

Next, the fused silicon was permeated into the produced porous carbon body at a temperature of 1500° C. to obtain the silicon/silicon carbide composite.

The bulk density, the porosity and the amount of the carbon left without reaction within said porous carbon body and said silicon/silicon carbide composite were measured in a manner similar to those in Example 1.

Also, the density and the standard deviation of the density of the silicon/silicon carbide composite was measured in the manner similar to the measurement of the density of the molding.

The results are shown in Table 3.

Example 11

Natural timber cellulose fibers were selected as cellulose fibers each having a fiber thickness of 50 μm and the length of 3 mm to produce the silicon/silicon carbide composite in a manner similar to the Example 10 and various measurements were conducted.

The results are shown in Table 3.

TABLE 3

| Examples | Molding of cellulose fiber | | Bulk density of the porous carbon body (g/cm³) | Silicon carbide material | | | Amount of carbon left without reaction (wt %) |
|---|---|---|---|---|---|---|---|
| | Density (g/cm³) | Standard deviation | | Density (g/cm³) | Standard deviation | Porosity (%) | |
| 10 | 0.346 | 0.011 | 0.315 | 2.586 | 0.088 | 0.17 | 0.18 |
| 11 | 0.328 | 0.076 | 0.298 | 2.446 | 0.508 | 0.21 | 0.33 |

As shown in Table 3, when paper pulp was selected as material cellulose fiber (Example 10), the standard deviation of the density of the molding thereof was smaller than when the natural timber cellulose fibers were used therefore (Example 11); that is, the density of the molding was observed more uniform. Further, it was confirmed that the result turned out to be similar when the standard deviation of the density of the silicon/silicon carbide composite obtained through the silicification treatment was measured.

In other words, it was confirmed that the density of the resultant silicon/silicon carbide composite and the uniformity of the physical characteristics in relation with said density (such as heat conductivity or thermal expansion factor or the like) within the same material are better when the paper pulp was used for the cellulose fiber in the present invention than when the natural timber cellulose fiber was used.

Comparative Example 7

5 weight % of thermosetting resin is impregnated into the cellulose fibers having a fiber thickness of 20 μm and the length of 3 mm to produce the molding and then the silicon/silicon carbide composite was produced in the same manner as Example 1 and various measurements were conducted.

The results are shown in Table 4.

Comparative Example 8

30 weight % of thermosetting resin is permeated into the cellulose fibers having a fiber thickness of 20 μm and the length of 3 mm to produce the molding and then the silicon/silicon carbide composite was produced in a manner similar to Example 1 to conduct various measurements.

The results are shown in Table 4.

TABLE 4

| | Fiber thickness (μm) | Bulk density of the porous carbon body (g/cm³) | Silicon Carbide material | | Carbon left without reaction (wt %) |
|---|---|---|---|---|---|
| | | | Density (g/cm³) | Porosity (%) | |
| Example 1 | 20 | 0.394 | 2.639 | 0.23 | 0.23 |
| Comparative Example 7 | 80 | 0.433 | 2.777 | 0.33 | 1.90 |
| Comparative Example 8 | 80 | 0.552 | 2.823 | 0.11 | 2.55 |

As shown in Table 4, in the case where the thermosetting resin was impregnated (Comparative Examples 7 and 8), the porous carbon body became denser than the case where the thermosetting resin was not permeated (Example 1) and therefore the amount of the carbon left without reaction in the produced silicon/silicon carbide composite had exceeded 1 weight %.

Also, in the case where the thermosetting resin was impregnated (Comparative Examples 7 and 8), the fiber thickness increased because of said resin and therefore unimpregnated portion of the fused silicon remains in the porous carbon body at silicification treatment.

For the reasons described above, it was acknowledged that it is difficult to produce the silicon/silicon carbide composite with a limited amount of carbon left without reacting with silicon and also high purity because the fiber thickness increases and the porous carbon body becomes denser.

The process for manufacturing the silicon carbide material in accordance with the present invention is able to produce the silicon/silicon carbide composite with a limited amount of carbon without reacting with silicon and also high purity by using the cellulose fiber such as paper pulp or the like as the material and carbon silicification method.

Examples 12 to 14

Articles formed of cellulose fibers such as the pulp used for paper making each having a thickness and a length of 3 mm as shown in Table 5 relating to Examples 12 to 14 were subjected to a carbonization process in nitrogen atmosphere at a temperature of 1000° C. to obtain porous carbon bodies having different bulk densities.

The bulk densities of said porous carbon members were measured by Archimedean Method.

Next, fused silicon was permeated into said porous carbon bodies at a temperature of 1600° C. to obtain silicon/silicon carbide composites. Thereafter, said silicon/silicon carbide composites were worked into dummy wafer substrates each having a diameter of 200 mm and a thickness of 0.5 mm.

The thus obtained dummy wafer substrates were subjected to a chemical analysis to measure the composition ratio between silicon and silicon carbide as well as to the Archimedean Method to obtain the bulk densities and porosities. Further, the three-point bending strength was also measured.

The results are shown in Table 5.

Comparative Examples 9 and 10

The cellulose fibers such as the pulp used for paper making each having a fiber thickness and a length of 3 mm as shown in Table 5 relating to Comparative Examples 9 and 10 were selected as materials to obtain porous carbon bodies having different densities. For the rest, dummy wafer substrates were prepared as taught in Example 12 for various measurements.

The results are shown in Table 5.

Comparative Example 11

60 parts by weight of silicon carbide powder having a mean particle size of 70 µm and 40 parts by weight of silicon carbide powder having a mean particle size of 10 µm are mixed with 11 parts by weight of binder being added thereto. The resultant mixture was kneaded, corned and formed. Thereafter, the same is subjected to calcination at a temperature of 1550° C. before fused silicon was permeated thereinto at a temperature of 1500° C. to complete the reaction sintering.

The resultant silicon/silicon carbide composite obtained from said reaction sintering was worked into a dummy wafer substrate as mentioned in Example 12 to be subjected to various measurements.

The results are shown in Table 5.

Comparative Example 12

A CVD silicon carbide film having a thickness of 800 µm was formed on the surface of a high purity carbon substrate at a temperature of 1250° C. by means of a $SiCl_4$ gas(1 l/min), a $C_3H_8$ gas(1 l/min) and a $H_2$ gas(50 l/min).

The resultant member is fired in an oxidizing atmosphere to be burned out.

The thus obtained silicon carbide material by the CVD method is worked on into a dummy wafer substrate as done in the Example 12 and subjected to various measurements.

The results are shown in Table 5.

TABLE 5

| | Fiber thickness (µm) | Bulk density of the porous carbon body (g/cm³) | Silicon/Silicon Carbide Composite | | | |
|---|---|---|---|---|---|---|
| | | | Si:SiC (Weight ratio) | Density (g/cm³) | Porosity (%) | Bending strength (MPa) |
| Example 12 | 15 | 0.372 | 45:55 | 2.747 | 0.10 | 274.2 |
| Example 13 | 20 | 0.363 | 60:40 | 2.618 | 0.10 | 217.3 |
| Example 14 | 34 | 0.241 | 75:25 | 2.501 | 0.14 | 185.0 |

TABLE 5-continued

| | Fiber thickness (µm) | Bulk density of the porous carbon body (g/cm³) | Silicon/Silicon Carbide Composite | | | |
|---|---|---|---|---|---|---|
| | | | Si:SiC (Weight ratio) | Density (g/cm³) | Porosity (%) | Bending strength (MPa) |
| Comparative Example 9 | 27 | 0.529 | 40:60 | 2.780 | 0.25 | 280.4 |
| Comparative Example 10 | 25 | 0.205 | 80:20 | 2.465 | 0.23 | 145.5 |
| Comparative Example 11 | — | — | 20:80 | 3.02 | 0.06 | 280 |
| Comparative Example 12 | — | — | 0:100 | 3.21 | 0 | 500 |

The dummy wafer substrate obtained in Example 12 was subjected to the measurement in accordance with the Frameless Atomic Absorption Spectrophotometry, in which a Normal Pressure Acid Extraction Method is incorporated to measure the concentration of elements contained as impurities.

The result will be shown in Table 6.

TABLE 6

| Elements as impurities | Fe | Ni | Cu | Na | Ca | Al | V | K | Cr |
|---|---|---|---|---|---|---|---|---|---|
| Concentration (ppm) | 0.22 | 0.02 | 0.01 | <0.01 | 0.03 | 0.20 | 0.05 | 0.05 | 0.02 |

As shown in Table 6, it was confirmed that the concentration of the elements contained as impurities in the silicon/silicon carbide composite (dummy wafer substrate) obtained as in Example 12 was low and of high purity to such an extent that the substrate can be used for semiconductor heat treatment.

In this connection, it was confirmed that the amount of the carbon left without reaction in the dummy wafer substrates obtained in Example 12 through 14 was all 0.2 weight % or less. With the carbon left without reaction being 0.2 weight % or less, it is possible to have said silicon/silicon carbide composite in an even more uniform structure such that formation of cracks or deformation can be effectively avoided.

Further, a CVD silicon carbide film having a thickness of 100 µm was formed on the surface of respective dummy wafer substrates obtained in Examples 12 through 14 and Comparative Examples 9 through 12 to produce a dummy wafer having a thickness of 0.7 mm.

Said dummy wafer is subjected to a durability test for a polysilicon film having a thickness of 2.5 μm on the surface of the wafer to be treated in a CVD treatment.

In said CVD treatment test, first of all, respectively 10 dummy wafers were placed on upper and lower portions of wafer boats having a total length of 120 mm, 172 grooves, a pitch of 3.5 mm, a groove width of 1 mm, and a groove depth of 5 mm and, thereafter, said wafer boat was admitted into the CVD reactor with a wafer to be treated being held between the upper and lower dummy wafers.

Then, $SiH_2Cl_2$ gas (2 l/min) and $H_2$ gas(20 l/min) was introduced into the reactor to conduct the heat treatment at a temperature of 1000° C. for 60 minutes to form a polysilicon film of 2.5 μm on the surface of the wafer to be treated.

Then, every time a round of said CVD treatments is over, the wafer treated was replaced with a new wafer to be treated such that the said CVD treatment was repeated.

As a result of the durability tests in said CVD treatment, it was confirmed that the dummy wafers manufactured in accordance with Examples 12 through 14 were found free from the exfoliation of the polysilicon film or the deterioration of the CVD silicon carbide film on the surface of the dummy wafer even after 20 rounds thereof.

In contrast, the dummy wafer manufactured in accordance with Comparative Examples 9, 11 and 12 was found subject to partial exfoliation of the polysilicon film from each dummy wafer as far as said CVD treatments were repeated at most twelve times.

It was also confirmed that micro cracks were found partially on the surface of the CVD-silicon carbide film in Comparative Example 10.

Further, the present invention can provides a high purity high toughness silicon/silicon carbide composite.

In this way, warp or breakage is prevented in the silicon/silicon carbide composite of the present invention, and thanks to its excellency in corrosion resistance, durability and thermal impact resistance, the semiconductor heat treatment composite of the invention is suitably used for the manufacture of the dummy wafer, wafer boat, reactor core tube, or the like.

What is claimed is:

1. A silicon/silicon carbide composite comprised of 45 to 75 weight % of silicon and 25 to 55 weight % of silicon carbide, said silicon carbide consisting essentially of an assembly of fibers each having a thickness of 150 μm or less and a length of 0.8 to 3.5 mm, said composite having a surface on which a silicon carbide film having a thickness of 30 to 500 μm is formed.

2. A silicon/silicon carbide composite according to claim 1, wherein said silicon/silicon carbide composite contains carbon left without reaction therein in an amount of 0.25% by weight or less.

3. A silicon/silicon carbide composite according to claim 1, wherein said silicon/silicon carbide composite contains the silicon carbide film having a thickness of 30 to 150 μm to form a dummy wafer having a total thickness of 0.5 mm to 1 mm.

4. A silicon/silicon carbide composite according to claim 1, wherein said silicon/silicon carbide composite is a semiconductor heat treatment member.

5. A silicon/silicon carbide composite consisting essentially of 45 to 75% by weight of silicon and 25 to 55% by weight of silicon carbide, said silicon carbide consisting essentially of an assembly of fibers each having a thickness of 150 μm or less and a length of 0.8 to 3.5 mm, said composite having a surface on which a silicon carbide film having a thickness of 30 to 500 μm is formed.

6. A silicon/silicon carbide composite according to claim 5, wherein said silicon/silicon carbide composite is a dummy wafer with the silicon carbide film having a thickness of 30 to 150 μm formed on the surface thereof, said dummy wafer having a total thickness of 0.5 to 1 mm.

7. A silicon/silicon carbide composite according to claim 5, wherein said silicon/silicon carbide composite is a semiconductor heat treatment member.

8. A silicon/silicon carbide composite according to claim 5, wherein said silicon/silicon carbide composite contains carbon left without reaction therein in an amount of 0.25% by weight or less.

9. A process for manufacturing a silicon/silicon carbide composite comprising a first step in which cellulose fibers each having a fiber thickness of 150 μm or less are heated at a temperature of 500° C. to 1500° C. in a non-oxidizing atmosphere to obtain a porous carbon body having a bulk density of 0.10 to 0.80 g/cm³;

and a second step in which said porous carbon body is silicified in an atmosphere containing silicon.

10. A process for manufacturing a silicon/silicon carbide composite according to claim 9, wherein said thickness of each cellulose fiber is within a range of 5 to 80 μm.

11. A process for manufacturing a silicon/silicon carbide composite according to claim 9 or 10, wherein the length of each cellulose fiber is 1.5mm or more.

12. A process for manufacturing a silicon/silicon carbide composite according to claim 9, wherein said cellulose fiber is paper pulp.

13. A process of manufacturing a silicon/silicon carbide composite according to claim 11, wherein said cellulose fiber is paper pulp.

14. A process for manufacturing a silicon/silicon carbide composite according to claim 9, wherein the bulk density of the porous carbon body produced by said first step is 0.70 g/cm³ or less.

15. A process for manufacturing a silicon/silicon carbide composite according to claim 9, in which a silicification treatment in said second step is conducted by either a reaction with fused silicon or a reaction with silicon monoxide gas.

16. A process for manufacturing a silicon/silicon carbide composite according to claim 11, wherein a silicification treatment in said second step is conducted by either a reaction with fused silicon or a reaction with silicon monoxide gas.

17. A process for manufacturing a silicon/silicon carbide composite according to claim 14, wherein a silicification treatment in said second step is conducted by either a reaction with fused silicon or a reaction with silicon monoxide gas.

18. A process for manufacturing a silicon/silicon carbide composite according to claim 9, wherein the porous carbon body produced by said first step is heated at a temperature of 1100° C. to 2000° C. in an atmosphere of halogen gas to be purified prior to the second step.

19. A process for manufacturing a silicon/silicon carbide composite according to claim 11, wherein the porous carbon body produced by said first step is heated at a temperature of 1100° C. to 2000° C. in an atmosphere of halogen gas to be purified prior to the second step.

20. A process for manufacturing a silicon/silicon carbide composite according to claim 15, wherein the porous carbon body produced by said first step is heated at a temperature of 1100° C. to 2000° C. in an atmosphere of halogen gas to be purified prior to the second step.

21. A process for manufacturing a silicon/silicon carbide composite according to claim 10, wherein the length of each cellulose fiber is 1.5 mm or more.

22. A process for manufacturing a silicon/silicon carbide composite according to claim 10, wherein said cellulose fiber is paper pulp.

23. A process for manufacturing a silicon/silicon carbide composite according to claim 10, wherein the bulk density of the porous carbon body produced by said first step is 0.70 g/cm$^3$ or less.

24. A process for manufacturing a silicon/silicon carbide composite according to claim 13, wherein the bulk density of the porous carbon body produced by said first step is 0.70 g/cm$^3$ or less.

25. A process for manufacturing a silicon/silicon carbide composite according to claim 10, in which a silicification treatment in said second step is conducted by either a reaction with fused silicon or a reaction with silicon monoxide gas.

26. A process for manufacturing a silicon/silicon carbide composite according to claim 13, in which a silicification treatment in said second step is conducted by either a reaction with fused silicon or a reaction with silicon monoxide gas.

27. A process for manufacturing a silicon/silicon carbide composite according to claim 10, wherein the porous carbon body produced by said first step is heated at a temperature of 1100° C. to 2000° C. in an atmosphere of halogen gas to be purified prior to the second step.

28. A process for manufacturing a silicon/silicon carbide composite according to claim 13, wherein the porous carbon body produced by said first step is heated at a temperature of 1100° C. to 2000° C. in an atmosphere of halogen gas to be purified prior to the second step.

29. A process for manufacturing a silicon/silicon carbide composite according to claim 16, wherein the porous carbon body produced by said first step is heated at a temperature of 1100° C. to 2000° C. in an atmosphere of halogen gas to be purified prior to the second step.

30. A process for manufacturing a silicon/silicon carbide composite according to claim 17, wherein the porous carbon body produced by said first step is heated at a temperature of 1100° C. to 2000° C. in an atmosphere of halogen gas to be purified prior to the second step.

\* \* \* \* \*